Patented July 26, 1949

2,477,292

UNITED STATES PATENT OFFICE 2,477,292

POLYVINYL-ALCOHOL-COATED SUPPOSITORY

George R. Fessenden, Philadelphia, Pa., assignor to Wyeth Incorporated, Philadelphia, Pa., a corporation of Delaware No Drawing. Application October 11, 1946, Serial No. 702,575

1 Claim. (Cl. 167—64)

This invention relates to a method of protecting suppositories by coating them with polyvinyl alcohol, and to the resulting product.

As is well known, suppositories are solid to semi-solid bodies containing medicaments, designed to be introduced into body cavities and to disintegrate there under the influence of body heat and/or moisture of body secretions, thus liberating and distributing their contents on the inner surfaces of the cavities. Suppositories are usually approximately cylindrical, conical or frusto-conical in shape. They are made of a great variety of materials, depending on their intended use, but in general have the common characteristic of disintegrating at a temperature in the neighborhood of 37° C.

This characteristic of suppositories poses a serious packaging problem. Individual suppositories must be kept from disintegrating and from coalescing with adjacent suppositories under conditions of temperature and humidity encountered in storage; whatever means is taken to achieve this end must be non-toxic, effective and economical, and preferably must not require removal or unwrapping before use.

I have discovered that a coating of polyvinyl alcohol, applied under the conditions described below, satisfactorily meets these requirements. It is effective in preventing disintegration of suppositories under temperature and humidity conditions normally met in storage, but itself disintegrates under the moisture conditions obtaining in body cavities, thus obviating the necessity of removing the coating from the suppository before use. Furthermore it has been shown that polyvinyl alcohol is non-toxic and non-irritating to the tissues and that it can be sterilized by autoclaving. (P. W. Perryman, The Lancet, London, December 15, 1945, pages 778–779.)

According to my invention I coat suppositories with polyvinyl alcohol, preferably by depositing it from a solution. I have found that a low-viscosity polyvinyl alcohol product produces good results.

For the sake of simplicity I use the word "solution" in the specification and claims in its broad sense to include colloidal solutions and liquid dispersions.

The polyvinyl alcohol may be deposited from a water solution, but drying time may be hastened by using as the liquid medium a mixture of water and a volatile aliphatic alcohol having a lower boiling point than water, such as ethanol.

The concentrations of polyvinyl alcohol and of volatile alcohol are not sharply critical and may vary considerably. I have had good results with 5%–40% solutions by weight of polyvinyl alcohol, but prefer to use a solution of approximately 20% by weight concentration. The concentration of volatile alcohol in the liquid medium may vary from 0% to 50% by volume, but I prefer to use a medium containing approximately 25% ethanol and 75% water by volume.

I have found that coating is facilitated, and when the suppositories contain a considerable amount of lipophilic substances such as wax, balsam and the like, the quality of the coating is improved, especially by adding a non-toxic surface-active material or wetting agent to the coating medium. This may be, for example, a soft soap (U. S. P. XI) in amounts varying from 5% to 15% by weight of the solids content of the medium, or, preferably, a water-soluble non-ionic material such as a polyoxyalkylene derivative of sorbitan monolaurate in an amount equal to approximately 5% by weight of the solids content of the medium. Instead of this agent, a smaller amount, approximately 2% on the same basis, of an oil-soluble surface-active agent may be, for example, used; this may be an unmodified sorbitan monolaurate.

I may apply my coating in numerous ways, for example by spraying, dipping, brushing or doctoring a solution, such as one of those just described, on the surface of the suppositories, and then evaporating the liquid medium in a current of air; the surface rapidly becomes tack-free, after which the coated suppositories may be further dried in any desired way. The coating may be applied in one coat or in a plurality of coats with intermediate partial or complete drying; single coats properly applied are satisfactory for most conditions met. Additional medicaments may be included in the coating. Ten percent zinc oxide powder, based on the solids content, has been used to produce a satisfactory, nearly opaque, whitish coating.

The coatings will vary somewhat in thickness on different areas of the suppository surface; but it is desirable in application to avoid excessively thick or thin spots. I have obtained good results by applying coatings weighing 0.08–0.10 g. (dry weight) to suppositories weighing between 3 and 4 g. each; i. e. the coatings weighed approximately 2%–3½% the weight of the suppositories. When a plurality of coatings is applied to meet extreme storage conditions, the total weight of coating may run up to 10% of the suppository weight.

The behavior of my coatings and their advantages may be readily demonstrated. The coated suppositories after drying can be readily handled individually at ordinary temperatures and humidities without abrasion, smearing or deformation. They can be packed in cardboard boxes, or in bottles or other containers without individual wrappings of tinfoil or the like, which have hitherto been required on certain types of suppository, and will retain their form and will not stick together under normal conditions of storage. If, however, one of my coated suppositories is immersed in a test tube of physiological saline solution at 37°–38° C., simulating body conditions, it will be seen that the coating rapidly disperses in the solution and the suppository disintegrates.

A specific example of my invention follows, but this is to be taken as illustrative only and not as limiting the scope of my invention, which is defined in the appended claim.

*Example*

A polyvinyl alcohol solution was made by slowly stirring 25 g. low-viscosity polyvinyl alcohol in 80 g. distilled water containing 1 g. of a commercial water-soluble non-ionic surface-active agent consisting substantially of a polyoxyalkylene derivative of sorbitan monolaurate, the water being kept at approximately 80° C. The liquid was strained through cheesecloth and allowed to cool to room temperature, after which 21 g. 95% ethanol was added. The resulting solution thus contained by weight approximately 20% polyvinyl alcohol, 1% water-soluble non-ionic surface-active agent (5% based on polyvinyl alcohol), 63% water, and 16% ethanol (20% by weight or 24% by volume of the water-alcohol mixture).

This liquid was then applied to suppositories having a cocoa-butter-wax-balsam base, weighing approximately 3.3 g. each, by means of an applicator or doctor having a stiffly flexible blade of plastic sheeting. During application the suppositories were rotated in flexible rubber chucks at approximately 100 R. P. M., one-half of each suppository being coated at a time, and the suppository, after tack-free drying of the coating, being reversed in the chuck for coating the second half. Air from a domestic 8-inch electric fan was circulated over the suppositories during coating and drying. Drying required 20–30 minutes at 20°–22° C. room temperature and 65%–80% relative humidity with continuous rotation. The coating on each suppository weighed approximately 0.08–0.1 g. Instead of complete drying in the rotating chucks, the final drying, after the tack-free stage has been reached, may be carried out in trays.

I claim:

A suppository comprising a base and a coating, the base containing a lipophilic substance, and the coating consisting to the extent of at least 85 percent of its weight of polyvinyl alcohol, being free of discrete fibrous material, being homogeneously dispersible in body fluids under conditions of use, and containing a non-toxic non-ionic surface-active material in an amount effective to facilitate application of the coating, said coating constituting from approximately two percent to approximately ten percent of the total weight of the suppository.

GEORGE R. FESSENDEN.

REFERENCES CITED

The following references are of record in the file of this patent:

UNITED STATES PATENTS

| Number | Name | Date |
|---|---|---|
| 398,085 | Schmelz | Feb. 19, 1889 |
| 1,366,941 | Rhodehamel | Feb. 1, 1921 |
| 1,858,108 | Neubert | May 10, 1932 |
| 2,072,302 | Hermann | Mar. 2, 1937 |
| 2,155,658 | Hermann | Apr. 25, 1939 |
| 2,160,503 | Hermann | May 30, 1939 |

FOREIGN PATENTS

| Number | Country | Date |
|---|---|---|
| 177,752 | Switzerland | Sept. 2, 1935 |
| 829,190 | France | June 14, 1938 |

OTHER REFERENCES

Martindale, Extra Pharmacopoeia, vol. 1, 22nd Ed. 1941, page 565.

Pijoan, J. A. M. A., Aug. 11, 1945, pages 1096–7.

Certificate of Correction

Patent No. 2,477,292                                 July 26, 1949

GEORGE R. FESSENDEN

It is hereby certified that errors appear in the printed specification of the above numbered patent requiring correction as follows:

Column 2, lines 24 and 25, strike out ", for example," and insert the same in line 25, after the word "be" and before "an"; column 4, list of references cited, lines 35 and 36, in each occurrence, for the name "Hermann" read *Herrmann et al.*; line 37, for "Hermann" read *Herrmann*; line 47, before "Pijoan" insert *Draeger and*; after line 47, add the following reference: *Lesser, The Drug and Cosmetic Industry, Apr. 1945, pages 442-445, 520 and 522*;

and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*